(12) United States Patent
Wozniak et al.

(10) Patent No.: US 10,335,839 B2
(45) Date of Patent: Jul. 2, 2019

(54) COMPONENT CONNECTOR SERVICER

(71) Applicant: Lockheed Martin Corporation, Bethesda, MD (US)

(72) Inventors: Michael Vincent Wozniak, Keller, TX (US); Ling Zhang Larson, Arlington, TX (US); Floyd A. Fazi, Jr., Fort Worth, TX (US); Jeffrey Allen Lucas, Arlington, TX (US); Stephen R. Wood, Benbrook, TX (US)

(73) Assignee: Lockheed Martin Corporation, Bethesda, MD (US)

( * ) Notice: Subject to any disclaimer, the term of this patent is extended or adjusted under 35 U.S.C. 154(b) by 395 days.

(21) Appl. No.: 15/196,300

(22) Filed: Jun. 29, 2016

(65) Prior Publication Data

US 2018/0003326 A1 Jan. 4, 2018

(51) Int. Cl.
*A47L 21/06* (2006.01)
*B08B 13/00* (2006.01)

(52) U.S. Cl.
CPC .......... *B08B 13/00* (2013.01); *B08B 2240/02* (2013.01)

(58) Field of Classification Search
USPC ......... 15/97.1, 210, 268; 356/73.1; 385/134, 385/135
See application file for complete search history.

(56) References Cited

U.S. PATENT DOCUMENTS

| | | | |
|---|---|---|---|
| 5,245,683 A * | 9/1993 | Belenkiy | G02B 6/3849 385/69 |
| 6,047,716 A | 4/2000 | Shimoji et al. | |
| 6,449,795 B1 | 9/2002 | Sato | |
| 6,810,552 B2 | 11/2004 | Miyake et al. | |
| 6,854,152 B2 | 2/2005 | Loder et al. | |
| 7,147,490 B2 | 12/2006 | Gerhard | |
| 7,356,236 B1 | 4/2008 | Huang et al. | |
| 8,079,111 B2 | 12/2011 | Fujiwara | |
| 8,266,755 B2 | 9/2012 | Nakane et al. | |
| 8,397,337 B2 | 3/2013 | Fujiwara | |
| 8,418,305 B2 | 4/2013 | Fujiwara | |
| 8,988,670 B2 * | 3/2015 | Zhou | B08B 5/02 356/73.1 |
| 2010/0272401 A1 | 10/2010 | Kachmar | |
| 2015/0367386 A1 | 12/2015 | Wilson et al. | |
| 2016/0103317 A1 * | 4/2016 | Bie | B08B 1/04 15/230 |

FOREIGN PATENT DOCUMENTS

| | | |
|---|---|---|
| JP | 2001188145 | 7/2001 |
| JP | 2012063648 | 3/2012 |

\* cited by examiner

*Primary Examiner* — Joseph J Hail
*Assistant Examiner* — Shantese L McDonald
(74) *Attorney, Agent, or Firm* — Baker Botts L.L.P.

(57) ABSTRACT

A system includes a body having a front end and a back end, a channel within the body that is configured to hold at least a portion of a service unit, a guiderail extending along a portion of the channel and configured to couple with a pushrod, and an adapter configured to couple with a portion of the service unit and a portion of the body. The channel also includes a front opening positioned proximate to the front end of the body, wherein the front opening is configured to allow at least a portion of the service unit, or at least a portion of a connector, to pass through the front opening, and a back opening positioned proximate to the back end of the body, wherein the back opening is configured to allow at least a portion of the pushrod to pass through the back opening.

17 Claims, 4 Drawing Sheets

COMPONENT CONNECTOR SERVICER

TECHNICAL FIELD

This disclosure relates in general to component servicers and more particularly to component connector servicers.

BACKGROUND

Components, such as electrical components, transmit signals via cables (e.g., wires, fiber optic cables, etc.). These cables may have one or more connectors attached to them that connect the cables to certain items, such as another component, another connector, another cable, another segment of the same cable, etc. The connectors, from time to time, may need to be inspected, maintained, and cleaned by hand. The connectors may be located in areas that are difficult to access. In addition, the cables and the connectors may be delicate and easily damaged.

SUMMARY OF THE DISCLOSURE

According to one embodiment, a system includes a body having a front end and a back end, a channel within the body that is configured to hold at least a portion of a service unit, a guiderail extending along a portion of the channel and configured to couple with a pushrod, and an adapter configured to couple with a portion of the service unit and a portion of the body. In this embodiment, the channel also includes a front opening positioned proximate to the front end of the body, wherein the front opening is configured to allow at least a portion of the service unit, or at least a portion of a connector, to pass through the front opening, and a back opening positioned proximate to the back end of the body, wherein the back opening is configured to allow at least a portion of the pushrod to pass through the back opening.

Technical advantages of certain embodiments may include allowing maintenance people to clean cables and connectors, such as fiber optic connectors, more efficiently, more ergonomically, and with less chance for error and breakage of the connector or cable. In addition, certain embodiments allow cleaning to occur quickly, or more quickly than cleaning by hand. Some embodiments reduce or eliminate the need for maintenance people to contort their bodies to reach the connectors or cables. Furthermore, certain embodiments align a cleaning unit (e.g., a cleaner) or an inspection unit (e.g., a microscope) with one or more connectors, thus reducing the chance of damaging expensive or delicate connectors, such as fiber optic connectors. In addition, some embodiments can connect with or attach to an existing tool, which can increase the ease with which maintenance people can inspect and clean connectors and cables without significantly adding cleaning, inspection, or training time.

Other technical advantages will be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

For a more complete understanding of the present disclosure and its advantages, reference is now made to the following description, taken in conjunction with the accompanying drawings, in which.

DETAILED DESCRIPTION OF THE DISCLOSURE

Components, such as electrical components, transmit signals via cables (e.g., wires, fiber optic cables, etc.). These cables may have one or more connectors attached to them that connect the cables to certain items, such as another component, another connector, another cable, another segment of the same cable, etc. The connectors, from time to time, may need to be inspected, maintained, and cleaned by hand. The connectors may be located in areas that are difficult to access. In addition, the cables and the connectors may be delicate and easily damaged.

The teachings of the disclosure recognize that these problems may be addressed, lessened, or eliminated by component connector servicers, which may in some embodiments include connector service holders, associated tools coupled to connector service holders, and/or service units (e.g., cleaning units and inspection units). The following describes component connector servicer systems and related apparatuses for providing these and other desired features.

Figure 1:
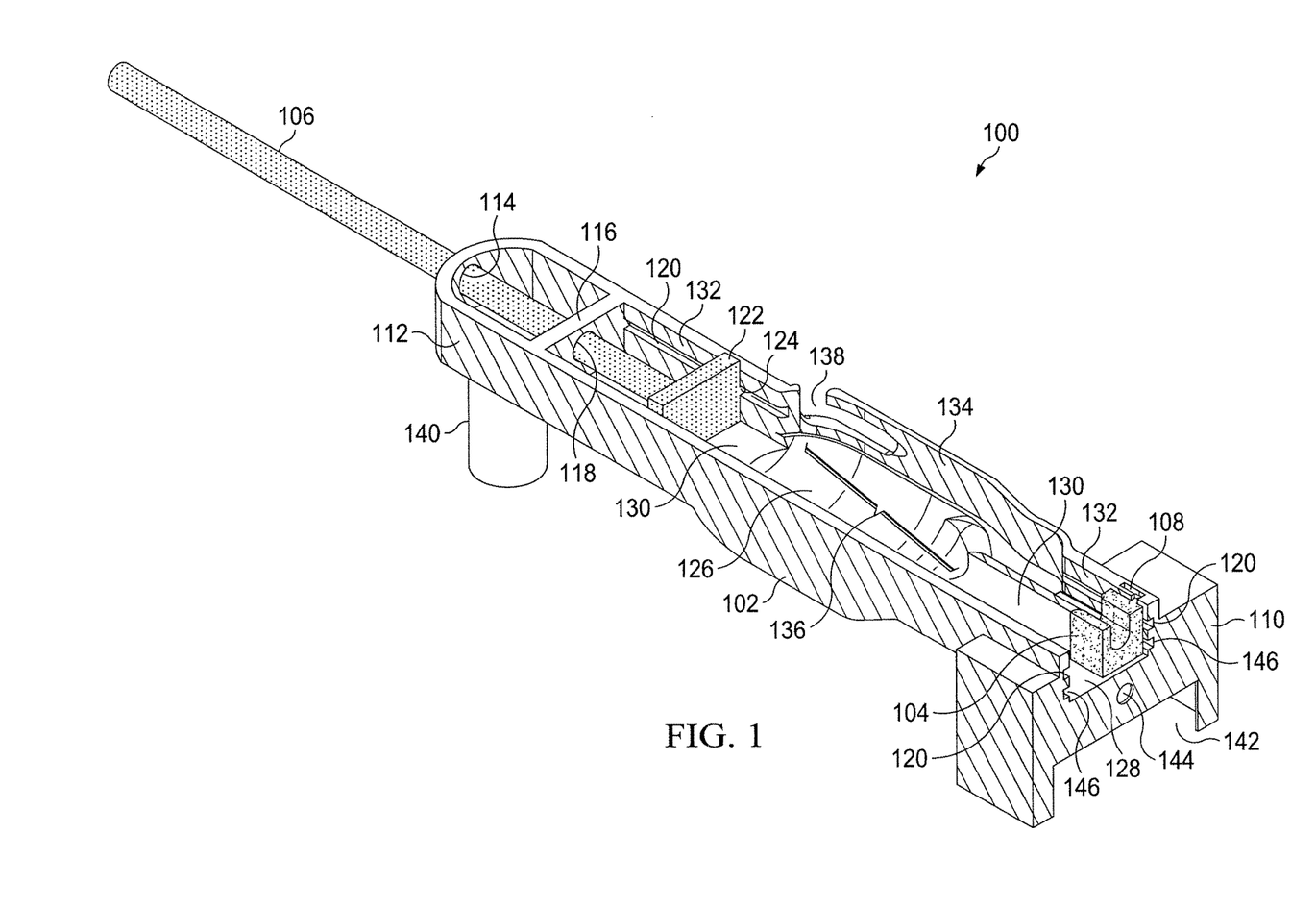
FIG. 1 illustrates an example system of a connection service holder for servicing a connector using a cleaning unit adapter, according to certain embodiments.

FIG. 1 illustrates an example system 100 of a connection service holder for servicing a connector using a cleaning unit adapter. System 100 may be referred to as a connector service holder. System 100 may include a body 102, a service unit adapter, such as cleaning unit adapter 104, and a pushrod 106. In example system 100, cleaning unit adapter 104 is coupled to body 102 near a front end 110 using an adapter guiderail, for example vertical adapter guiderail 108. In this example, a portion of cleaning unit adapter 104 is keyed to mate with vertical adapter guiderail 108, which, when fit together, couple body 102 and cleaning unit adapter 104. In example system 100, pushrod 106 is coupled to body 102 near a back end 112 by passing through a back opening 114. In certain embodiments, pushrod 106 may be coupled to body 102 by passing through a pushrod stabilizer 116 via a pushrod stabilizer opening 118. In some embodiments, pushrod 106 may be coupled to body 102 using a guiderail 120. In this example, a pushrod head 122 is part of pushrod 106 and includes a pushrod guiderail mate 124. Pushrod guiderail mate 124 may be keyed to mate with guiderail 120, which, when fit together, couple body 102 and pushrod 106.

In general, system 100 provides an operator with a connector service holder that, consistent with the description herein, can hold a service unit (as shown, for example in FIGS. 3 and 4) and allow the operator to more safely and efficiently service cable connectors and/or cables. System 100 can, in certain embodiments, be used to clean or inspect connectors. In general, body 102 of system 100 may have a channel, such as channel 126, that allows one or more service units (e.g., a microscope or cleaner) to rest at least partially within body 102. One aspect of this disclosure contemplates that, by placing a service unit in body 102, an operator can manipulate system 100 to more easily and effectively use service units to service connectors than when holding service units in hand.

In some embodiments, body 102 may be made of metal, plastic, polymer, fiber, resin, or any other suitable material. Body 102 may have a front end 110 and a back end 112, where front end 110 and back end 112 are positioned apart and/or opposite from each other. In some embodiments, front end 110 and back end 112 may be positioned directly opposite from one another (such as, for example, if the length of body 102 is oriented along a single axis and is not significantly curved), although other orientations of front end 110 and back end 112 are contemplated (such as for example, if body 102 is curved or bent and front end 110 and back end 112 are positioned apart but not directly opposite from one another). In certain embodiments, body 102 may have a front opening 128 located at or near front end 110 and a back opening 114 located at or near back end 112. Body 102 may have any suitable shape.

In particular embodiments, body 102 may have a channel 126 within it, and channel 126 may extend along the entire length of body 102 (e.g., from front end 110 to back end 112) or along a portion or several portions of body 102. In certain embodiments, the dimensions of channel 126 may be such that one or more service units can fit inside some or all of channel 126. For example, an inner bottom face 130 of channel 126 may be shaped and/or at a depth within body 102 to accept a particular service unit, for example, a cleaning unit or inspection unit. Inner bottom face 130 may be flat, curved, or of any shape. In some embodiments, multiple inner bottom faces 130 may exist on different planes (e.g., at different heights inside body 102). As another example, a sidewall 132 may be positioned such that the distance across channel 126 (e.g., between sidewalls 132 on opposite sides of channel 126) is wide enough to accept a particular service unit, for example a cleaning unit or an inspection unit. In some embodiments, a particular service unit may fit snugly or loosely inside channel 126. Particularly, a service unit may fit snugly inside channel 126, but loose enough to slide along the length of channel 126 if force is applied, for example, by pushrod 106. Channel 126 may have any suitable shape.

In some embodiments, channel 126 may have one or more extended sidewalls 134 that are not on the same plane as sidewalls 132. In an example embodiment (such as shown in FIG. 1), extended sidewalls 134 may be curved, and such curved sidewalls may, in some embodiments, be shaped to accommodate a particular service unit (e.g., a microscope). Likewise, channel 126 may have one or more depressions 136 that are not on the same plane as inner bottom face 130. In an example embodiment (such as shown in FIG. 1), depression 136 may be curved, and such curved depression may, in some embodiments, be shaped to accommodate a particular service unit (e.g., a microscope). While extended side walls 134 and depression 136 are shown in FIG. 1 as extending wider than sidewalls 132 and inner bottom face 130, respectively, other embodiments contemplate extended sidewalls 134 and depressions 136 that extend narrower and/or higher than sidewalls 132 and/or inner bottom face 130. In addition, other embodiments may have extended sidewalls 134 and or depressions 136 that are not curved (or not only curved) but rather made of straight edges, geometric shapes, or any other shape.

Particular embodiments may include an auxiliary opening 138, which may be located anywhere along body 102, for example, in a portion of extended sidewall 134. In some embodiments, auxiliary opening 138 may allow for access to portions of a service unit placed inside body 102, provide an opening for a cable or wire attached to a service unit to extend from a service unit to a component outside of body 102 (e.g., a cable running from a microscope service unit to an external video monitor viewable by the operator of system 100), reduce the weight of system 100 by removing unnecessary material from body 102, allow for visual inspection or confirmation of the placement of a service unit in body 102, cool a service unit placed in body 102, provide coolant, adhesive, or any other substance to a service unit, and/or support any other suitable use.

In some embodiments, body 102 may be configured to include guiderail 120. In the example of FIG. 1, a pair of guiderails 120 run from the front end 110 of body 102 along the length of body 102, ending at pushrod stabilizer 116. Guiderails 120 may, in some embodiments, provide a guide for objects such as pushrod 106 to couple with body 102. In this example, pushrod guiderail mate 124 (located, e.g., on pushrod head 122) fits into and couples with a guiderail 120. In this example, guiderails 120 are a groove in portions of sidewalls 132 (not extending to extended sidewalls 134), though in other embodiments guiderails 120 may not be grooves cut into body 102 but rather protrusions from body 102 that couple with a correspondingly shaped groove in pushrod head 122. Guiderails 120 may be configured to have any suitable shape. In some embodiments, guiderails may extend into some or all of extended sidewalls 134 that may exist as part of channel 126. FIG. 1 shows one pushrod guiderail mate 124 coupling with one guiderail 120, however other portions of pushrod head 122 may have pushrod guiderail mates 124 that couple with other guiderails 120. For example, a second pushrod guiderail mate may be positioned opposite to pushrod guiderail mate 124 and may couple with the second guiderail 120 shown in FIG. 1 (the two guiderails 120 are shown as being opposite from one another, but in some embodiments may be configured differently). In some embodiments, one or multiple guiderails 120 (located at any suitable point on body 102) may couple with one or multiple pushrod guiderail mates 124 (located at any suitable point on pushrod 106, including pushrod head 122) in any suitable combination. Additionally, in particular embodiments, guiderails 120 may extend through all, some, multiple sections, or none of body 102.

In certain embodiments, body 102 may have guiderails other than guiderails 120. For example, body 102 may have adapter guiderails that allow various service unit adapters to couple with body 102 (though, in some embodiments, guiderails 120 may function as adapter guiderails in addition to or instead of guiderails for a pushrod 106). As an example, body 102 may have a vertical adapter guiderail 108. Vertical adapter guiderail 108 may be operable to allow certain adapters to couple with body 102. For instance, cleaning unit adapter 104 may be shaped or configured such that a portion of cleaning unit adapter 104 can mate with vertical adapter guiderail 108, securing cleaning unit adapter 104 to body 102. While FIG. 1 shows a protruding portion of cleaning unit adapter 104 fitting into a vertical adapter guiderail 108 that is a groove or slot in body 102, this disclosure contemplates that vertical adapter guiderail 108 may be configured to be a protrusion that mates with a slot or groove in an adapter, such as cleaning unit adapter 104. In certain embodiments, vertical adapter guiderail 108 may couple with and secure service unit adapters that are narrower than channel 126 and/or front opening 128. In some embodiments, vertical adapter guiderail 108 is not necessarily vertical in relation to body 102, or orthogonal to the axis of guiderail 120, but rather not parallel in relation to body 102 or the axis of guiderail 120. While FIG. 1 shows a single vertical adapter guiderail 108 positioned on body 102, this disclosure contemplates any number of vertical adapter guiderails 108 positioned at any suitable location on body 102. Similarly, while FIG. 1 shows vertical adapter guiderails 108 as positioned close to the edge of front end 110, vertical adapter guiderails 108 may be positioned at other locations on body 102.

Furthermore, in some embodiments, body 102 may have adapter guiderails other than vertical adapter guiderail 108, such as horizontal adapter guiderails 146. In example embodiments, horizontal adapter guiderails 146 may allow certain adapters to couple with body 102. For instance, a service unit adapter, such as inspection unit adapter 204 of FIG. 2, may be shaped or configured such that a portion of inspection unit adapter 204 can mate with horizontal adapter guiderails 146, securing inspection unit adapter 204 to body 102. While FIG. 1 shows horizontal adapter guiderails 146 as grooves or slots in body 102, this disclosure contemplates that horizontal adapter guiderails 146 may be configured to be protrusions that mate with a slot or groove in a service unit adapter, such as inspection unit adapter 204. In certain embodiments, horizontal adapter guiderails 146 may couple with and secure service unit adapters that are of similar width compared to channel 126 and/or front opening 128. In some embodiments, horizontal adapter guiderails 146 are not necessarily horizontal in relation to body 102, or parallel to the axis of guiderail 120, but rather not orthogonal in relation to body 102 or the axis of guiderail 120. While FIG. 1 shows a pair of horizontal adapter guiderails 146 positioned opposite from one another across front opening 128, this disclosure contemplates any number of horizontal adapter guiderails positioned at any suitable location on body 102. Similarly, while FIG. 1 shows horizontal adapter guiderails 146 as extending all the way to the edge of front end 110, horizontal adapter guiderails 146 may stop before front end 100 or may be positioned at other locations on body 102.

In particular embodiments, body 102 may have a pushrod stabilizer 116 positioned on body 102, which may have a pushrod stabilizer opening 118 inside pushrod stabilizer 116. In example embodiments, pushrod stabilizer opening 118 may be shaped to allow some or all of pushrod 106 to pass through pushrod stabilizer opening 118, and for example, may be shaped to hold pushrod 106 snugly. In some embodiments, back opening 114 may be similarly shaped to allow for some or all of pushrod 106 to pass through back opening 114. Particular embodiments may have both back opening 114 and pushrod stabilizer opening 118, such that pushrod 106 sits more stably in a body 102 having both a back opening 114 and a pushrod stabilizer opening 118 than it does in a body 102 having one opening 114 or 118 but not the other. While the example embodiment of FIG. 1 shows a single pushrod stabilizer 116 (with a pushrod stabilizer opening 118) located closer to backend 112 of body than to front end 110, this disclosure contemplates other embodiments having any number of pushrod stabilizers 116 located anywhere suitable on body 102. For example, pushrod stabilizer 116 may be located at or near front end 110, including closer or further to front end 110 than a service adapter, such as clear adapter 104. In certain embodiments, the placement of pushrod stabilizer 116 on body 102 is such that sufficient room remains in body 102 for an operator of system 100 to place a service unit at least partially in body 102. As another example, in an embodiment, a pushrod stabilizer 116 may be positioned at or close to front end 110 such that a service unit can be placed between pushrod stabilizer 116 and back end 112. In this example, pushrod stabilizer opening 118 may allow a portion of a service unit to pass through and/or a portion of a connector targeted for service to pass through to contact the service unit.

In some embodiments, body 102 may include a handle 140. Handle 140 may be used by an operator of system 100 to grip body 102 using, for example, the operator's hand or some other object. In certain embodiments, handle 140 may be configured to couple with another object, such as a tool. Handle 140 may be of any suitable shape or size and may be made out of the same or different materials that form body 102.

In particular embodiments, body 102 may have a coupling area 142. Coupling area 142 may be formed out of body 102 and/or may contain a coupling mechanism (e.g., clips, clamps, screws, fasteners, indentations for clips belonging to other objects, adhesive, etc.). In some embodiments, coupling area 142 may be used to couple body 102 to another object, such as a tool, and may be configured to fit snugly or loosely onto or into the object (e.g., coupling area 142 may be shaped to mate with the object). Coupling area 142 may be disposed at or near front end 110 or along any other portion of body 102, and body 102 may have none, one, or multiple coupling areas 142.

In some embodiments, body 102 may be configured to include a guide hole 144. Generally, guide hole 144 may be configured to couple with a guide pin located near a connector that an operator of system 100 intends to service (a target connector). For example, if a piece of material (e.g., metal or a non-target connector) protrudes from a face near a target connector, guide hole 144 may be configured to couple with the piece of material in any suitable manner (e.g., by being shaped to mate with the piece of material). In some embodiments, this piece of material may be referred to as a guide pin. In this example, guide hole 144 may be placed on body 102 such that, by coupling guide hole 144 with a corresponding guide pin, a service unit placed in body 102 is configured to properly align with the target connector that the operator seeks to service. In some embodiments, configuring body 102 to use a guide hole 144 and a guide pin may further increase the ease with which an operator can properly align a target connector with a service unit, decrease the risk of the operator damaging the target connector, and/or reduce the time required to service the target connector. While the example of FIGURE shows a single guide hole 144, some embodiments may have fewer or more guide holes 144 than shown in FIG. 1, and guide holes 144 may be placed at any suitable point on body 102. Furthermore, some embodiments may have one or more guide pins, either instead of or in addition to guide hole 144, where such guide pins are configured to couple to guide holes near a target connector and assist an operator of system 100 to align a service unit in body 102 with the target connector.

Figure 3:
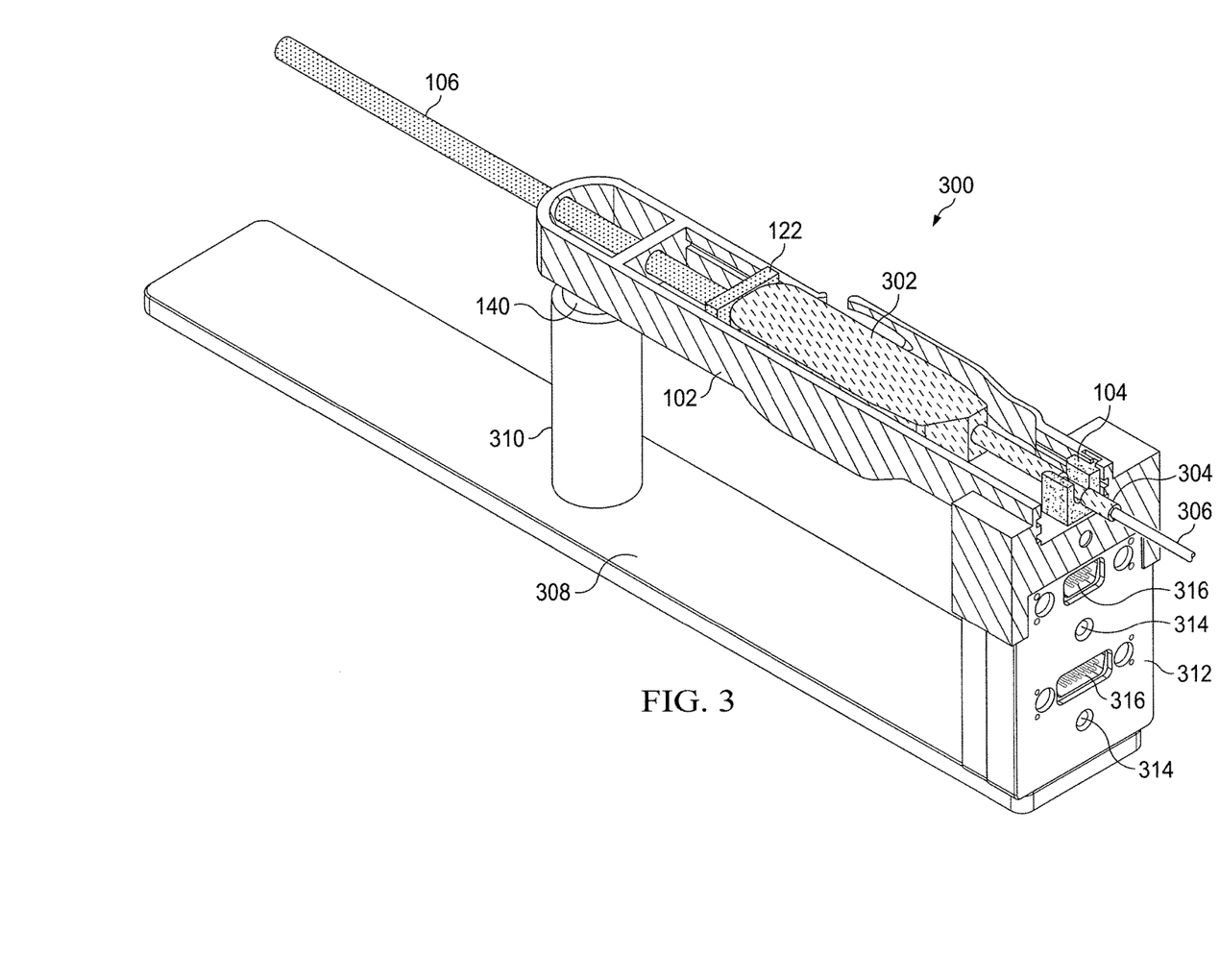
FIG. 3 illustrates an example system of a component connector servicer, including the example system of FIG. 1 holding a cleaning unit and coupled with a tool, according to certain embodiments.

Certain embodiments of system 100 may include a service unit adapter, such as cleaning unit adapter 104. cleaning unit adapter 104 is generally operable to couple to body 102 and/or a service unit, such as a cleaning unit (e.g., a fiber optic cable connector cleaner). Cleaning unit adapter 104 may assist in holding or stabilizing a cleaning unit in body 102. In the example system 100, cleaning unit adapter 104 is coupled to body 102 near front end 110 using an adapter guiderail, for example vertical adapter guiderail 108. In this example, a portion of cleaning unit adapter 104 is keyed to mate with vertical adapter guiderail 108, which, when fit together, couple body 102 and cleaning unit adapter 104. Once coupled together, cleaning unit adapter 104 and body 102 may hold a cleaning unit adapter (e.g., as shown in FIG. 3) at least partially inside body 102 and/or channel 126. In particular embodiments, cleaning unit adapter 104, along with guide hole 144, align a cleaning unit, or other service unit, with a target connector that an operator of system 100 intends to service. In particular embodiments, cleaning unit adapter 104 prevents a cleaning unit from sliding out of front opening 128. While FIG. 1 shows cleaning unit adapter 104 as positioned nearly flush with front end 110, cleaning unit adapter 104 can be positioned at any suitable location on body 102. Furthermore, while FIGURE shows cleaning unit adapter 104 as being coupled to body 102 by vertical adapter guiderail 108, cleaning unit adapter 104 may be coupled to body 102 by other methods, such as using grooves or depressions in inner bottom face 130, facets of channel 126, clips, fasteners, or the like, adhesives, horizontal adapter guiderails 146, guiderails 120, or other methods. As one example, cleaning unit adapter 104 may be coupled to body 102 by coupling with guiderails 120 or horizontal adapter guiderails 146 and, in some examples, then use plugs or caps that fit into the guiderails 120 or horizontal adapter guiderails 146 to prevent some or all movement of cleaning unit adapter 104 along guiderails 120 or horizontal adapter guiderails 146.

Certain embodiments of system 100 may include a pushrod 106. Generally, pushrod 106 is operable to couple with body 102 and exert force on items in channel 126, such as a portion of a service unit. Pushrod 106 may be used to, in some embodiments, apply pressure to a service unit to prevent it from falling out of body 102 or from sliding toward back end 112, press the service unit more forcefully against a target connector (e.g., ensuring the service unit and the connector mate or that the service unit works as intended), ensure the service unit couples with an adapter, such as cleaning unit adapter 104, pull the service unit back from a target connector, or any other suitable use. In example system 100, pushrod 106 is coupled to body 102 near back end 112 by passing through back opening 114. In certain embodiments, pushrod 106 may be coupled to body 102 by passing through pushrod stabilizer 116 via pushrod stabilizer opening 118. In some embodiments, pushrod 106 may be coupled to body 102 using guiderail 120. In the example of FIG. 1, pushrod head 122 is integrated with pushrod 106 and includes pushrod guiderail mate 124. Pushrod guiderail mate 124 may be keyed to mate with guiderail 120, which, when fit together, couples body 102 and pushrod 106. While FIG. 1 shows one pushrod guiderail mate 124, pushrod 106 may have multiple pushrod guiderail mates 124, for example, that mate with both guiderails 120 shown in FIG. 1 or any other guiderail or portion of channel 126.

In particular embodiments, pushrod head 122 has facets, fasteners, adhesives, or other methods of coupling to a service unit, such that pushrod 106 can be used by an operator of system 102 to push and/or pull against a service unit placed in channel 126. In some embodiments, a portion of pushrod 106 that can pass through back opening 114 (and that is not pushrod head 122) may be referred to as a pushrod body. As part of pushrod 106, the example pushrod body shown in FIG. 1 is a cylindrical object that passes through portions of body 102 and connects to pushrod head 122. In this disclosure, references to pushrod 106 may refer, as applicable, to a pushrod body, pushrod head 122, and/or pushrod guiderail mate 124, or any combination thereof, unless specifically stated otherwise.

In some embodiments, pushrod 106 is coupled to body 102 by inserting pushrod 106 through back opening 114, inserting pushrod 106 through pushrod stabilizer opening 118, and/or mating pushrod guiderail mate 124 with a guiderail, such as guiderail 120. For example, pushrod 106 may be coupled with body 102 by placing pushrod 106 (including, e.g., pushrod head 122) near front end 110, sliding the end of pushrod 106 (e.g., the pushrod body) toward back end 112 and through back opening 114 and/or pushrod stabilizer opening 118, aligning pushrod guiderail mate 124 with guiderail 120, and sliding pushrod 106 along body 102 until pushrod head 122 contacts back end 112 or pushrod stabilizer 116.

Figure 2:
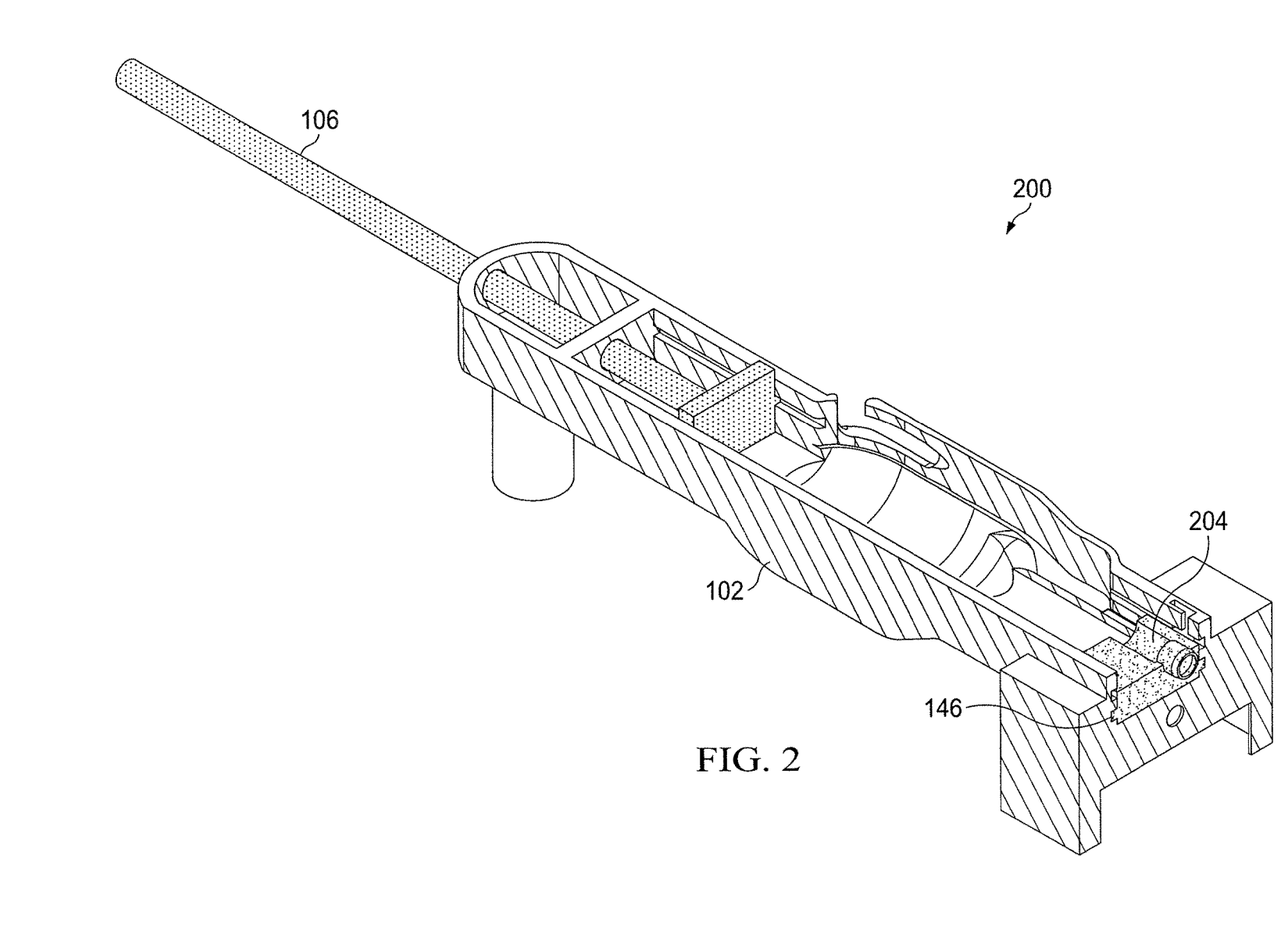
FIG. 2 illustrates an example system of a connection service holder for servicing a connector using an inspection unit adapter, according to certain embodiments.

FIG. 2 illustrates an example system 200 of a connection service holder for servicing a connector using an inspection unit adapter 204. System 200 may be referred to as a connector service holder. System 200, as shown in FIG. 2, is the same as system 100, as shown in FIG. 1, except that system 200 includes an inspection unit adapter 204 coupled to body 102 instead of a cleaning unit adapter 104. In certain embodiments, different service units may use different adapters, and FIG. 2 shows one example of a connector service holder using a different adapter than the cleaning unit adapter 104 used in FIG. 1. In some embodiments, however, a single adapter may work with multiple types of service units. In still other embodiments, no adapter may be necessary, for example, because channel 126 may be shaped such that certain service units placed in body 102 are properly aligned or cannot slide out of front opening 128, or because body 102 may be shaped to couple with certain service units in a manner similar to how an adapter might, thereby reducing or eliminating the need for an adapter (such as cleaning unit adapter 104 or inspection unit adapter 204).

While inspection unit adapter 204 in FIG. 2 is shown as connecting to body 102 by coupling with horizontal adapter guiderails 146, in other embodiments inspection unit adapter 204 may exist as having the same or similar variations as cleaning unit adapter 104, as discussed in relation to FIG. 1.

FIG. 3 illustrates an example system 300 of a component connector servicer, including the example system 100 of FIG. 1 holding a cleaning unit 302 and coupled with a tool 308. Example system 300 shows a cleaning unit 302 (e.g., a cleaner that cleans connectors and/or cables) resting inside body 102 and coupled to cleaning unit adapter 104. Pushrod 106 is shown as being pushed forward to contact cleaning unit 302 with pushrod head 122. Example system 300 also shows sheath 304 of cleaning unit 302 coupled with a connector of cable 306 (the end of cable 306, including the connector of cable 306, are obscured inside sheath 304). In addition, system 300 is coupled to tool 308 by handle 140 coupling with a tool handle 310 and by coupling area 142 (not illustrated in FIG. 3) coupling with tool coupling portion 312.

In general, example system 300 couples body 102 of a connector service holder, such as system 100, with an object, such as tool 308. Once coupled, system 300 generally increases the efficiency and/or safety of servicing target connectors and or cables compared to an operator using system 100 alone by, for example, providing guide holes 314 and/or connector mates 316 to align a service unit, such as cleaning unit 302, with a target connector on cable 306.

In some embodiments, system 300 may include a cleaning unit 302, such as a cleaner. Generally, cleaning unit 302 is capable of cleaning a target connector associated with a cable (e.g., cable 306, such as a fiber optic cable connector) or a cable itself (e.g., cable 306, such as a fiber optic cable). As described in this disclosure in relation to system 100, in some embodiments cleaning unit 302 may rest at least partially in body 102 and may be coupled to an adapter, such as cleaning unit adapter 104. In addition, pushrod 106 may be pushed by an operator of example system 300 (or, e.g., system 100) to contact cleaning unit 302. In certain embodiments, the force of pushrod 106 against cleaning unit 302 may assist in keeping cleaning unit 302 inside of body 102, or may assist in pressing cleaning unit 302 firmly enough against a target connector of cable 306 to engage and clean the target connector, which may include putting a sheath 304 around the target connector to couple with it. In some embodiments, the force of pushrod 106 against cleaning unit 302 may assist in pushing and pulling against cleaning unit 302 to clean (e.g., scrub, brush, or wipe) the target connector that an operator of system 300 wishes to clean. Cleaning unit 302 may be configured to clean a specific connector or type of connector, or it may be able to generally clean many connectors or types of connectors.

In some embodiments, system 300 may include a tool 308, which may be coupled to body 102 in one or more locations. In general, tool 308 increases the efficiency and/or safety of servicing target connectors and or cables compared to an operator using system 100 alone. For example, tool 308 may be coupled with body 102 by coupling handle 140 with tool handle 310 in any suitable manner. In some embodiments, this coupling may create a portion of system 300 that an operator can grip with his hand or another object. As another example, tool 308 may be coupled with body 102 by coupling tool coupling portion 312 with coupling area 142 in any suitable manner.

Tool 308, in particular embodiments, may include one or more guide holes 314. Guide holes 314 may be similar to guide hole 144 on body 102, and the scope of this disclosure regarding to guide hole 144 applies to guide holes 314 as well. In addition, tool 308 may contain one or more connector mates 316. In some embodiments, connector mate 316 couples with a connector of a cable or component located near a target connector that an operator of system 300 intends to service. By connecting connector mate 316 with its corresponding connector near the target connector, system 300 assists in aligning cleaning unit 302 (and, in some instances, sheath 304) with the target connector in cable 306. In this way, connector mate 316 operates similarly to guide holes 314 and/or 144. For example, connector mate 316 may be configured to connect to a data port of a component located near a target fiber optic cable connector that an operator of system 300 wishes to clean. By coupling system 300, via connector mate 316, to the data port, system 300 may align cleaning unit 302 and/or sheath 304 with the target fiber optic cable connector (e.g., of cable 306). Once aligned, system 300 may, for example, be operable to service (e.g., clean) the target fiber optic cable connector of cable 306 using cleaning unit 302. In certain embodiments, connector mates 316 may be positioned on body 102.

Figure 4:
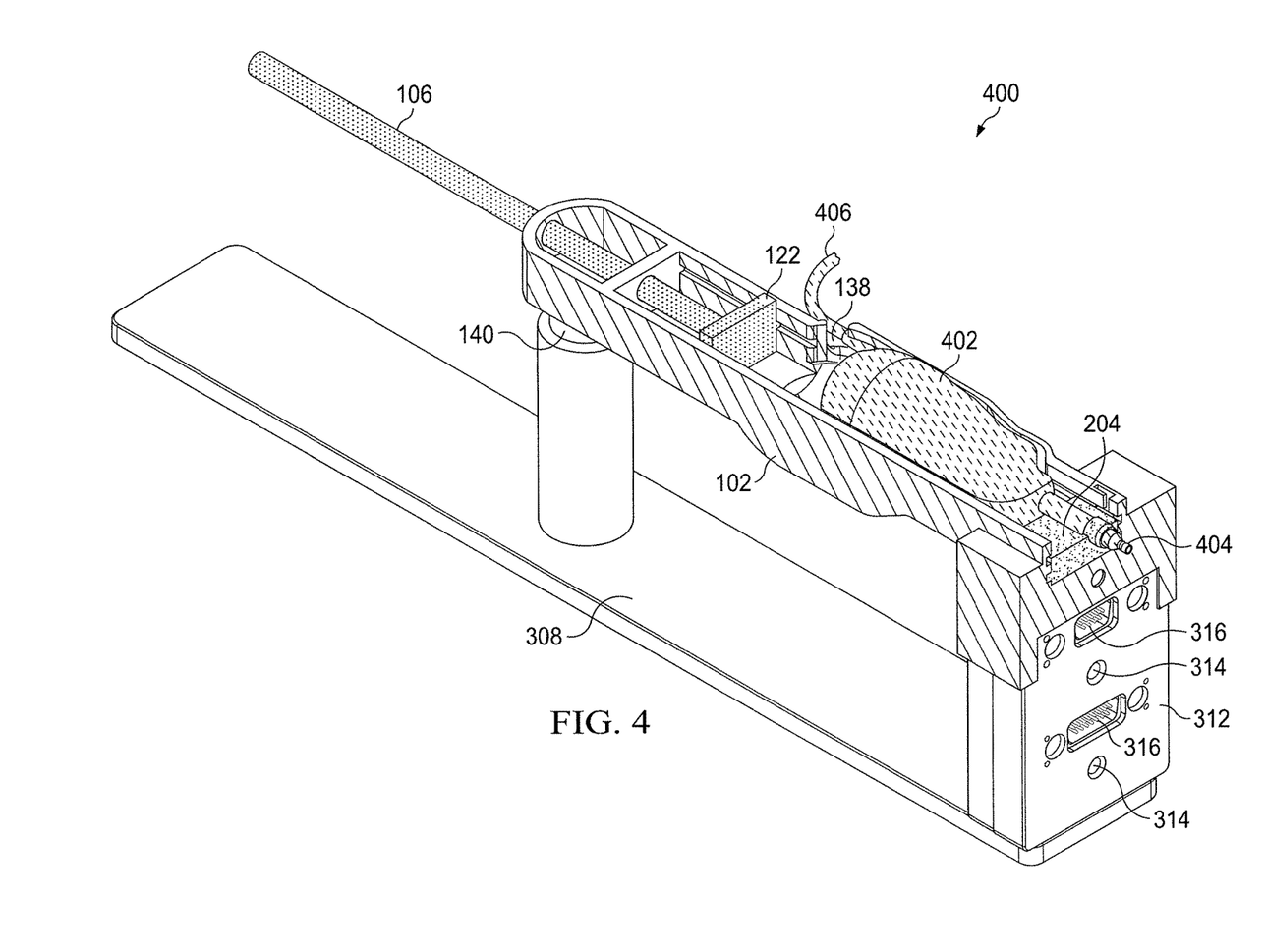
FIG. 4 illustrates an example system of a component connector servicer, including the example system of FIG. 2 holding an inspection unit and coupled with a tool, according to certain embodiments.

FIG. 4 illustrates an example system 400 of a component connector servicer, including the example system 200 of FIG. 2 holding an inspection unit 402 and coupled with a tool 308. Example system 400, as shown in FIG. 4, is the same as system 300, as shown in FIG. 3, except that system 400 includes an inspection unit 402 coupled with inspection unit adapter 204 instead of a cleaning unit 302 coupled with cleaning unit adapter 104. Example system 400 shows inspection unit 402 (e.g., a microscope that inspects connectors and/or cables) resting inside body 102 and coupled to inspection unit adapter 204. Pushrod 106 is shown and, in certain embodiments, can be pushed forward to contact inspection unit 402 with pushrod head 122. Example system 400 also shows inspection unit tip 404 of inspection unit 402, which may be used to inspect a target connector of a cable (e.g., a connector of cable 306) or a cable, for example, a fiber optic cable. In addition, system 400 is coupled to tool 308 by handle 140 coupling with tool handle 310 and by coupling area 142 (not shown in FIG. 4) coupling with tool coupling portion 312.

In general, example system 400 couples body 102 of a connector service holder, such as system 200, with an object, such as tool 308. Once coupled, system 400 generally increases the efficiency and/or safety of servicing target connectors and or cables compared to an operator using system 200 alone by, for example, providing guide holes 314 and/or connector mates 316 to align a service unit, such as inspection unit 302, with a target connector on cable 306.

In some embodiments, system 400 may include an inspection unit 402, such as a microscope. Generally, inspection unit 402 is capable of inspecting a target connector associated with a cable (e.g., cable 306, such as a fiber optic cable connector) or a cable itself (e.g., cable 306, such as a fiber optic cable). As described in this disclosure in relation to system 100, in some embodiments inspection unit 402 may rest at least partially in body 102 and may be coupled to an adapter, such as inspection unit adapter 204. In addition, pushrod 106 may be pushed by an operator of example system 400 (or, e.g., system 100) to contact inspection unit 402. In certain embodiments, the force of pushrod 106 against inspection unit 402 may assist in keeping inspection unit 402 inside of body 102, in pressing inspection unit 402 firmly enough against a target connector of cable 306 to engage and inspect the target connector, which may include pushing and pulling against inspection unit 402 to inspect (e.g., visually inspect, test connectivity or other elements of a target cable or connector, etc.) the target connector that an operator of system 400 wishes to clean. Inspection unit 402 may be configured to inspect a specific connector or type of connector, or it may be able to generally inspect many connectors or types of connectors. In some embodiments, inspection unit tip 404 couples with or is aligned with a target connector or cable. In the example embodiment of FIG. 4, inspection unit tip 404 allows inspection unit 402 to gather light or other information. Inspection unit 402 may then process and output data and/or transmit the light or other information via inspection unit cable 406 to a remote component, such as a video display. An operator of system 400 may be able to view the video display to inspect the target connector or cable. In some embodiments, inspection unit cable 406 may exit system 400 via an auxiliary opening 138, though in other embodiments, inspection unit cable 406 may exit system 400 via any other suitable path.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, functions, operations, or steps, any of these embodiments may include any combination or permutation of any of the components, elements, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A system, comprising:
  a connector service holder, comprising:
    a body comprising a front end and a back end positioned apart from the front end;
    a channel within the body and configured to hold at least a portion of a service unit, the channel comprising:
      a front opening positioned proximate to the front end of the body, wherein the front opening is configured to allow at least a portion of the service unit, or at least a portion of a connector, to pass through the front opening; and
      a back opening positioned proximate to the back end of the body, wherein the back opening is configured to allow at least a portion of a pushrod to pass through the back opening;
    a guiderail extending along at least a portion of the channel and configured to couple with the pushrod;
    an adapter configured to couple with at least a portion of the service unit and at least a portion of the body;
    pushrod stabilizer opening configured to allow at least a portion of the pushrod to pass through the pushrod stabilizer opening;
    the pushrod comprising:
      a pushrod body;
      a pushrod head coupled to the pushrod body; and
      a pushrod guiderail mate coupled to the pushrod, wherein the pushrod guiderail mate is configured to couple with the guiderail; and
    at least one of a guide hole and a guide pin positioned on the body and configured to align the connector service holder with a connector by coupling the at least one of a guide hole and a guide pin with a corresponding object;
  the service unit, comprising at least one of a cleaning unit and an inspection unit held, at least partially, in the channel and coupled to the adapter; and
  a tool coupled to the connector service holder, the tool comprising:
    a first interface configured to couple to the connector service holder; and
    a second interface configured to couple to another object;
  wherein the tool is configured to align the connector service holder with a connector by coupling the second interface to the other object.

2. A connector service holder, comprising:
  a body comprising a front end and a back end positioned apart from the front end;
  a channel within the body and configured to hold at least a portion of a service unit, the channel comprising:
    a front opening positioned proximate to the front end of the body, wherein the front opening is configured to allow at least a portion of the service unit, or at least a portion of a connector, to pass through the front opening; and
    a back opening positioned proximate to the back end of the body, wherein the back opening is configured to allow at least a portion of a pushrod to pass through the back opening;
  a guiderail extending along at least a portion of the channel and configured to couple with the pushrod;
  an adapter configured to couple with at least a portion of the service unit and at least a portion of the body; and
  the service unit comprising at least one of a cleaning unit and an inspection unit held, at least partially, in the channel and coupled to the adapter.

3. The connector service holder of claim 2, the body further comprising a pushrod stabilizer comprising a pushrod stabilizer opening configured to allow at least a portion of the pushrod to pass through the pushrod stabilizer opening.

4. The connector service holder of claim 2, further comprising the pushrod comprising:
  a pushrod body;
  a pushrod head coupled to the pushrod body; and
  a pushrod guiderail mate coupled to the pushrod, wherein the pushrod guiderail mate is configured to couple with the guiderail.

5. The connector service holder of claim 2, further comprising at least one of a guide hole and a guide pin configured to align the connector service holder with a connector by coupling the at least one of a guide hole and a guide pin with a corresponding object.

6. The connector service holder of claim 2, further comprising a connector mate configured to align the connector service holder with a connector by coupling the connector mate with a corresponding object.

7. The connector service holder of claim 2, the body further comprising at least one of a vertical adapter guiderail separate from the guiderail and a horizontal adapter guiderail separate from the guiderail; and
  wherein the adapter is configured to couple with least a portion of the body by mating with the at least one of a vertical adapter guiderail and a horizontal adapter guiderail.

8. The connector service holder of claim 2, the body further comprising a coupling area configured to couple with a tool.

9. The connector service holder of claim 2, wherein the channel comprises:
  sidewall; and
  an extended sidewall positioned further away from the center of the channel than the sidewall; and
  wherein the channel is configured to hold at least two different service units, one service unit held at least partially by contacting the sidewall, and another service unit held at least partially by contacting the extended sidewall.

10. A system, comprising:
  a connector service holder, comprising:
    a body comprising a front end and a back end positioned apart from the front end;
    a channel within the body and configured to hold at least a portion of a service unit, the channel comprising:
      a front opening positioned proximate to the front end of the body, wherein the front opening is configured to allow at least a portion of the service unit, or at least a portion of a connector, to pass through the front opening; and a back opening positioned proximate to the back end of the body, wherein the back opening is configured to allow at least a portion of a pushrod to pass through the back opening;

a guiderail extending along at least a portion of the channel and configured to couple with the pushrod;

an adapter configured to couple with at least a portion of the service unit and at least a portion of the body; and the pushrod comprising:
a pushrod body;
a pushrod head coupled to the pushrod body; and
a pushrod guiderail mate coupled to the pushrod, wherein the pushrod guiderail mate is configured to couple with the guiderail; and a tool coupled to the connector service holder, the tool comprising:
a first interface configured to couple to the connector service holder; and
a second interface configured to couple to another object;
wherein the tool is configured to align the connector service holder with a connector by coupling the second interface to the other object.

11. The system of claim 10, the body further comprising a pushrod stabilizer comprising a pushrod stabilizer opening configured to allow at least a portion of the pushrod to pass through the pushrod stabilizer opening.

12. The system of claim 10, wherein the second interface comprises at least one of a guide hole and a guide pin.

13. The system of claim 10, wherein the second interface comprises a connector mate.

14. The system of claim 10, the body further comprising at least one of a vertical adapter guiderail separate from the guiderail and a horizontal adapter guiderail separate from the guiderail; and wherein the adapter is configured to couple with least a portion of the body by mating with the at least one of a vertical adapter guiderail and a horizontal adapter guiderail.

15. The system of claim 10, wherein the channel comprises:
a sidewall; and
an extended sidewall positioned further away from the center of the channel than the sidewall; and
wherein the channel is configured to hold at least two different service units, one service unit held at least partially by contacting the sidewall, and another service unit held at least partially by contacting the extended sidewall.

16. The system of claim 10, further comprising the service unit, the service unit comprising a cleaner held, at least partially, in the channel and coupled to the adapter.

17. The system of claim 10, further comprising the service unit, the service unit comprising a microscope held, at least partially, in the channel and coupled to the adapter.

* * * * *